United States Patent [19]

Alitz

[11] Patent Number: 5,047,775
[45] Date of Patent: Sep. 10, 1991

[54] AUTOMATIC RANGE ADJUSTABLE WEATHER RADAR SYSTEM

[75] Inventor: Orville J. Alitz, Marion, Iowa

[73] Assignee: Rockwell International Corporation, El Segundo, Calif.

[21] Appl. No.: 589,865

[22] Filed: Sep. 27, 1990

[51] Int. Cl.[5] ............................................. G01S 7/34
[52] U.S. Cl. .................................................. 342/26
[58] Field of Search .................... 342/26, 82, 89, 98

[56] References Cited

U.S. PATENT DOCUMENTS

| | | | |
|---|---|---|---|
| 4,370,652 | 1/1983 | Lucchi | 342/26 |
| 4,529,983 | 7/1985 | Lyall | 342/26 |

Primary Examiner—Mark Hellner
Attorney, Agent, or Firm—Gregory G. Williams; M. Lee Murrah; H. Fredrick Hamann

[57] ABSTRACT

The range of a weather radar systems (60) is automatically extended by incrementally increasing the pulse width (17) from transmitter (12) in response to detecion of excessive path attenuation determined by a comparator (32) comparing the level of actual attenuated return pulses (19) from a range correction accumulator (34) with a path attenuation compensation level selected by a computer (26). The bandwidth of the receiver (14), the value in an initial sensitivity time control value circuit (54), the value in a path attenuation compensation correction value circuit (62) and the path attenuation correction alert threshold are also selectively varied automatically in accordance with the incremental changes in the width of transmitted pulses (17).

20 Claims, 3 Drawing Sheets

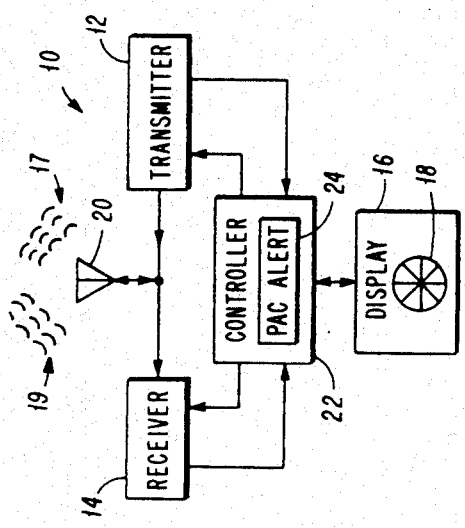
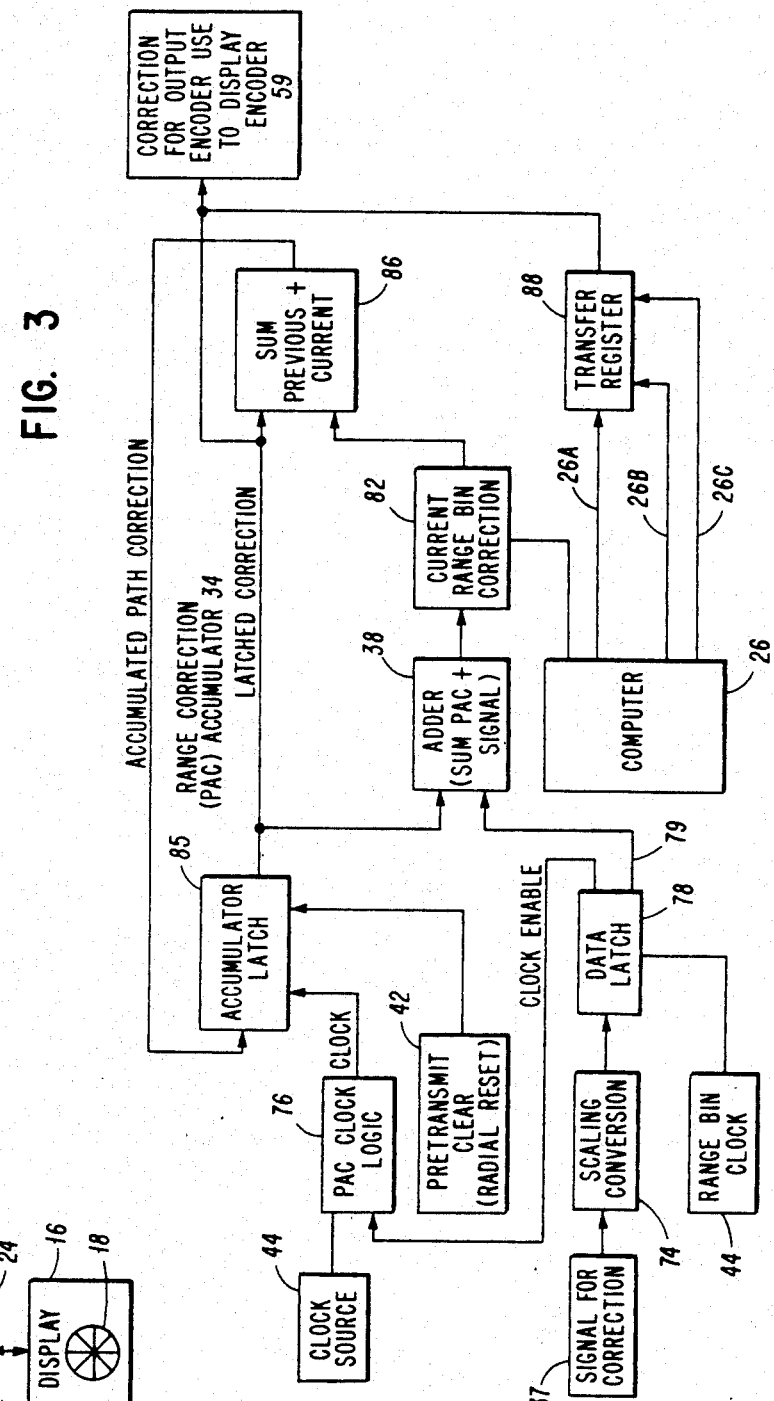
FIG. 1A PRIOR ART
FIG. 3

AUTOMATIC RANGE ADJUSTABLE WEATHER RADAR SYSTEM

BACKGROUND OF THE INVENTION

1. Technical Field

This invention relates to weather radar systems and, more particularly, to weather radar systems with path attenuation detection.

1. Description of the Related Art

Referring to FIG. 1A, a prior art weather radar system 10 is shown having a transmitter 12, a receiver 14, a display 16 with radials 18 and a common antenna 20 for transmitting pulses 17 to, and receiving echo pulses 19 from, the target, such as a precipitation target (not shown). A controller 22 interfaces with each of the transmitter 12, receiver 14 and display 18 as well as with an operator through manual inputs (not shown). The controller 22 includes an accumulator (not shown) which is sequentially incremented in range to generate a path attenuation compensation, or PAC, value with which to correct the displayed information. If the amount of attenuation compensation required exceeds a preset value based upon system capability for the selected parameters, a PAC alert discrete memory element is set and the display 18 alerted through the controller 22 to represent a PAC alert warning on the range radial 18 of interest.

The controller 22 provides the prior art radar system 10 with programmable parameters including transmitter pulse width, receiver bandwidth, initial STC (sensitivity time control) value and PAC (path attenuation compensation) threshold. In addition to input from the receiver 14 and transmitter 12, the controller 22 includes a PAC alert circuit 24. The controller 22 is able to change these programmable parameters on essentially a PRF (pulse repetition frequency) to PRF basis.

In order to maximize range resolution of the radar return from a target, such as precipitation, it is necessary to transmit the minimum pulse width. On the shorter selected ranges of a radar, the pulse width is optimumized for the required range coverage using the minimum transmit pulse width to preserve the best range resolution. If RF path attenuation exists due to intervening precipitation, then sufficient return may not be available from the farther range targets to detect and display them. When this occurs, it is standard practice to alert the operator to this possibility of reduced performance by marking the radial 18 of occurrence on the display 16 using information from far range bins (not shown) of the controller 22. The far range bins are random access memories which store data at the maximum displayed range. When the data from the far range bins are used for display, this is detected, to provide the display with a contrasting color. While alerting the operator to such a situation with this contrasting color is somewhat helpful, it still does not solve the problem of the loss of displayed information. In fact, the operator has no idea of what meteorological conditions might exist behind the displayed target, if the path attenuation is severe.

Unfortunately, even if the path attenuation becomes excessive as determined by the PAC alert circuit 24 within controller 22 as a result of the precipitation target returns, the system is unable to automatically improve performance. Instead operator intervention is required to manually increase sensitivity. Such manual adjustment often results in loss of far range calibration within the constraints of the maximum performance limitations of the system under condition of severe path attenuation.

Various attempts have been made to automatically make adjustments to contain other parameters to improve performance. In U.S. Pat. No. 4,370,652 of Lucchi issued Jan. 25, 1983 for "Control Systems for Radar Receivers", a radar control system is shown in which the receiver bandwidth and the gain of the receiver is automatically controlled by means of a computer, or discrete controller. The receiver gain is adjusted on the basis of the depth of the target received in order to improve long range detection capability. If long range targets have sufficient depth there is a detection advantage. The receiver bandwidth is adjusted on the basis of the received return time width, and the receiver gain is adjusted on the basis of the return time of the signal. The longer the return time, the narrower the receiver bandwidth can be made, and the greater the sensitivity, or gain.

A radar system with incremental AGC is shown in U.S. Pat. No. 4,680,588 of Cantwell issued July 14, 1987 for "Radar Systems With Incremental Automatic Gain Control". The AGC setting is adjusted by 6 db for each range cell in a next sweep based on the AGC setting of each corresponding range cell measurement in the present sweep. The gain of the receiver is changed on a bin to bin basis in order to maintain the receiver dynamic range within that presented by the signal. This is necessary in order to prevent receiver saturation which would distort the target information while maintaining a maximum sensitivity to lower level, target returns. Disadvantageously, this approach requires excessive hardware and software requirements and each incremental change must be done in real time.

In U.S. Pat. No. 3,149,332 of Kocher issued Sept. 15, 1964 for "Radar Isoecho Contour Sensitivity Gate", gain changes are switched into the receiver in order to change the receiver threshold and provide isoecho contour, i.e. a calibrated output, which improves the information displayed to the operator.

In each of the U.S. Pat. Nos. 3,525,095 of Cordry issued Aug. 18, 1970; 4,435,707 of Clark issued Mar. 6, 1984 and 4,529,983 of Lyall issued July 16, 1985, means for path attenuation compensation are provided. Unfortunately, compensation appears to be provided only within the receiver gain control range, and none appear to address the problem occurring when the system reaches maximum gain, or sensitivity, prior to display of the maximum range and can no longer compensate for path attenuation.

Disadvantageously, none of the above prior art radar systems adjust the transmitted pulse width or the receiver bandwidth as a function of path attenuation of the weather target in order to preserve maximum range resolution while having the advantage of maximum system detection capability, if a severe path attenuating circumstance is encountered.

SUMMARY OF THE INVENTION

Accordingly, it is an object of the present invention to provide a radar system which overcomes the aforementioned problems of the prior art radar systems associated with the inability to automatically adjust range, resolution or other related parameters in response to detection of excessive path attenuation. This objective is achieved in part by providing an automatic range adjuster in a weather radar system having a pulse transmitter, a receiver, means for compensating for path attenuation and means for detecting path attenuation when path attenuation is excessive and beyond the capability of the compensating means to correct display errors caused by the excessive path attenuation. The automatic range adjuster has means for selectively altering the width of the pulses generated by the pulse transmitter and means for automatically controlling the selective width altering means to alter the pulse widths of the transmitter pulses in response to the excessive path attenuation means. Preferably, the controlling means automatically controls the selective width altering means to increase the pulse width of the transmitter pulses in response to detection of excessive path attenuation.

It is also an object to provide in a weather radar system including a pulse transmitter, a receiver with a variable bandwidth and means for determining path attenuation, an automatic range adjuster having means for detecting excessive path attenuation and means responsive to said detecting means for altering the range of the system including means for automatically altering the receiver bandwidth.

In the preferred embodiment, all of the system parameters of initial sensitivity time control value for correct range compensation, path attenuation compensation and path attenuation level for detection of excessive path attenuation, in addition to receiver bandwidth, are varied automatically in response to the path attenuation.

The objective of the invention is also achieved by provision of a method of operating a weather radar system comprising the steps of initially operating the system with a given set of parameters for a selected resolution for a given range, detecting excessive path attenuation and automatically changing the system to operate with successive sets of parameters to successively alter the range in increments in response to detection of excessive path attenuation.

Preferably, the system is first operated with a given set of parameters for an optimal resolution for a given range and the parameters are automatically changed to extend the range in increments in response to detection of excessive path attenuation until the first to occur of (a) nondetection of excessive path attenuation and (b) achievement of maximum range.

BRIEF DESCRIPTION OF THE DRAWINGS

The foregoing objects, features and advantages will be described in greater detail and other advantageous features will be made apparent from the following detailed description of the preferred embodiment which is given with reference to the several figures of the drawings, in which:

FIG. 1A is a functional block diagram of a prior art radar system;

FIG. 3 is a functional block diagram of another embodiment of the radar system with an automatic range adjuster of the present invention in which comparisons for PAC alert are performed by a computer instead of by a general comparator block as in FIG. 2.

DESCRIPTION OF THE PREFERRED EMBODIMENT

Figure 1B:
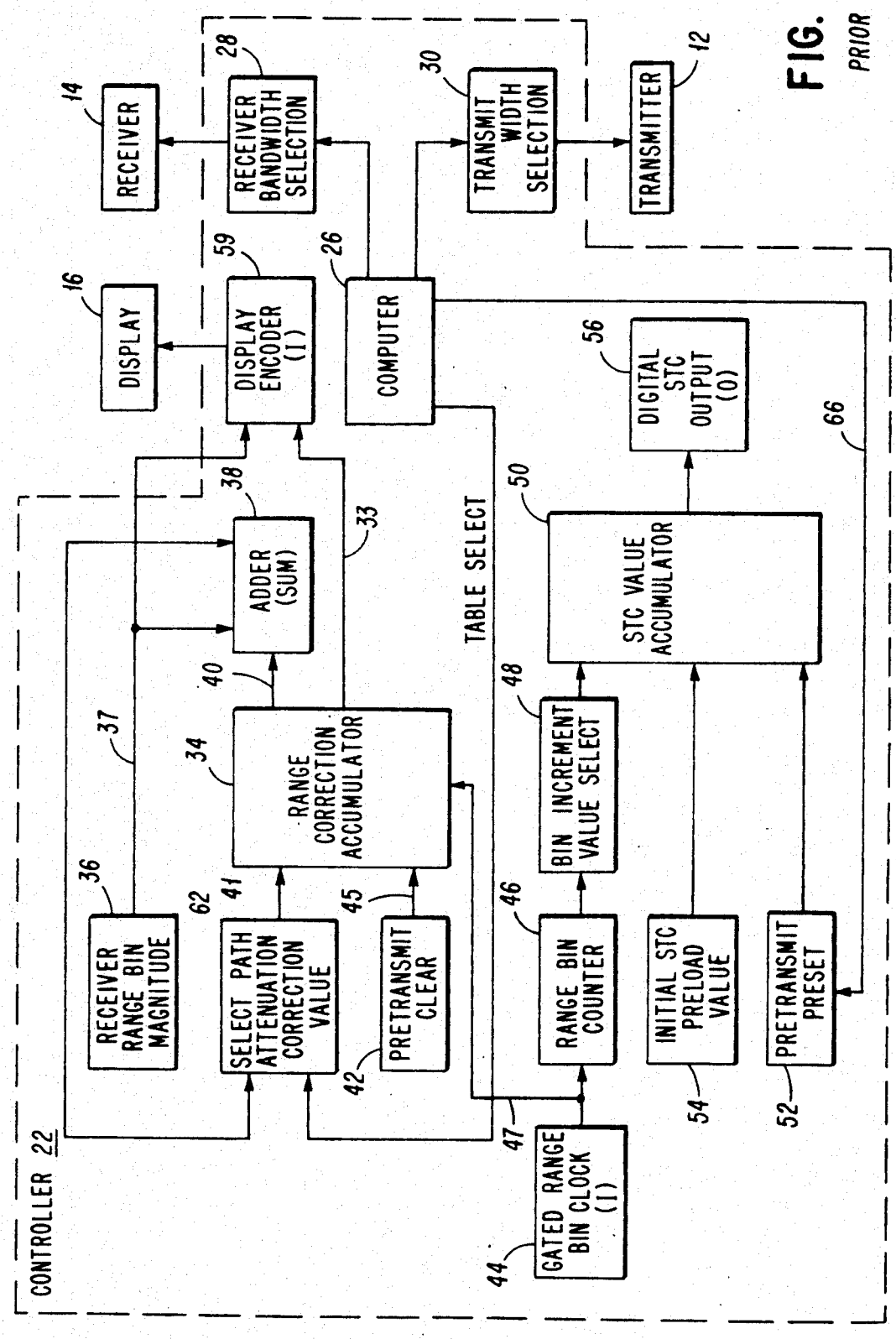
FIG. 1B is a functional block diagram of the elements of the prior art system of FIG. 1A and the interfaces between those elements.

Referring now to FIG. 1B, a specific implementation of the radar system of FIG. 1A is shown. The prior art system shown in FIG. 1B is made by the assignee of this application and is known as the Collins WXR-700 Weather Radar System, and is a system with respect to which the automatic range adjuster and method of the invention may be used as an improvement. The operation of this system is described in Collins WRT-701X Receiver Transmitter Troubleshooting Manual, Vol. II, 3d revision, October 1987 and U.S. Pat. Nos. 4,600,925 issued July 5, 1986 to Alitz el al.; 4,628,318 issued Dec. 9, 1986 to Alitz and 4,717,917 issued Jan. 5, 1988 to Alitz.

Briefly referring to FIG. 1B, the controller 22 is seen to have a computer 26 with outputs connected with a receiver bandwidth selection circuit 28 and with a transmit pulse width selection circuit 30. The computer 26, in response to manual inputs (not shown), applies control signals to the receiver bandwidth selection circuit 28 to cause it to vary the bandwidth of the receiver 14. Control signals applied to the transmit pulse width selection circuit 30 in response to manual inputs causes it to vary the width of the pulses 17, FIG. 1A, from the transmitter 12. The computer 26, also has an output 64, which provides control signals to select the applicable correction table from the select path correction value 62 which is a PROM table containing path attenuation correction values.

The received pulses 19 are digitally filtered by a variable band filter associated with a receiver range bin circuit 36 which applies its output 37 to an adder circuit 38 and display encoder 59. This receiver range bin magnitude input from output 37 and applied to adder 38 is the RMS digitized binary value of the energy received from the radar target. This value on output 37 is combined, i.e. summed, by the adder 38 with signals on an output 40 from the range correction accumulator 34, which represent all previous corrections accumulated along the received radial 18, FIG. 1A. The output 38 of adder 39 is used by the select path attenuation value 62 to select 41 for application to the range correction accumulator 34. The range correction accumulator 34 Provides the magnitude of the accumulated correction (PAC) 33 to the display encoder 59 to be used for adjustment of the encoder threshold as established by computer 26 and to determine if a PAC alert exists. If the accumulated correction exceeds a predetermined fixed value the display encoder 59 sets the PAC warning code for display 16. The display encoder 59 also receives the receiver range BIN magnitude 36 to be processed for the display 16.

An output signal from pretransmit clear circuit 42 is applied to another input 45 to clear the range correction accumulator 34 at the beginning of transmissions. A third input 45 to the accumulator 34 is taken from a gated range bin clock circuit 44 for provision of timing signals thereto.

The gated range BIN clock 44 also applies timing signals to an STC section including a range BIN counter circuit 46, a BIN increment value selection circuit 48, an STC value accumulator 50 with a pretransmit preset circuit 52 and an initial STC preload value circuit 54. The STC value accumulator 50 responds to signals at its input to provide a signal to a digital STC output circuit 56 which in turn is connected to the gain control for the second IF stage of the receiver 14.

Each different system performance configuration requires a unique receiver sensitivity time control (STC) value. This requirement is accommodated by selecting an initial STC preload value (gain reduction, negative value) from a computer software table, loading this value into the STC value accumulator just prior to the start of the gated range bin clock 44. The range bin counter 46 generates the address for the bin increment value select circuit, or PROM, 48 which applies positive values to the STC value accumulator 50. Each value is determined by its time relation relative to the start of the count of the range bin counter 46, i.e. the leading edge of the transmit pulse. For the weather return, assuming a usual 6 Db/octave correction, the correction value, Vc is defined by equation (1), below:

$$V_c = 20 \text{ LOG}_{10} \left[ \frac{\text{RANGE BIN COUNT}}{\text{RANGE BIN COUNT} - 1} \right] \quad \text{Equation (1)}$$

When the output of the accumulator 34 ≧ zero, the receiver 14 is at maximum usable gain. The digital STC output 56 is used to control the gain of the receiver 14 to normalize the target return in receiver range bin magnitude block 36 for changes in radar range.

Figure 2:
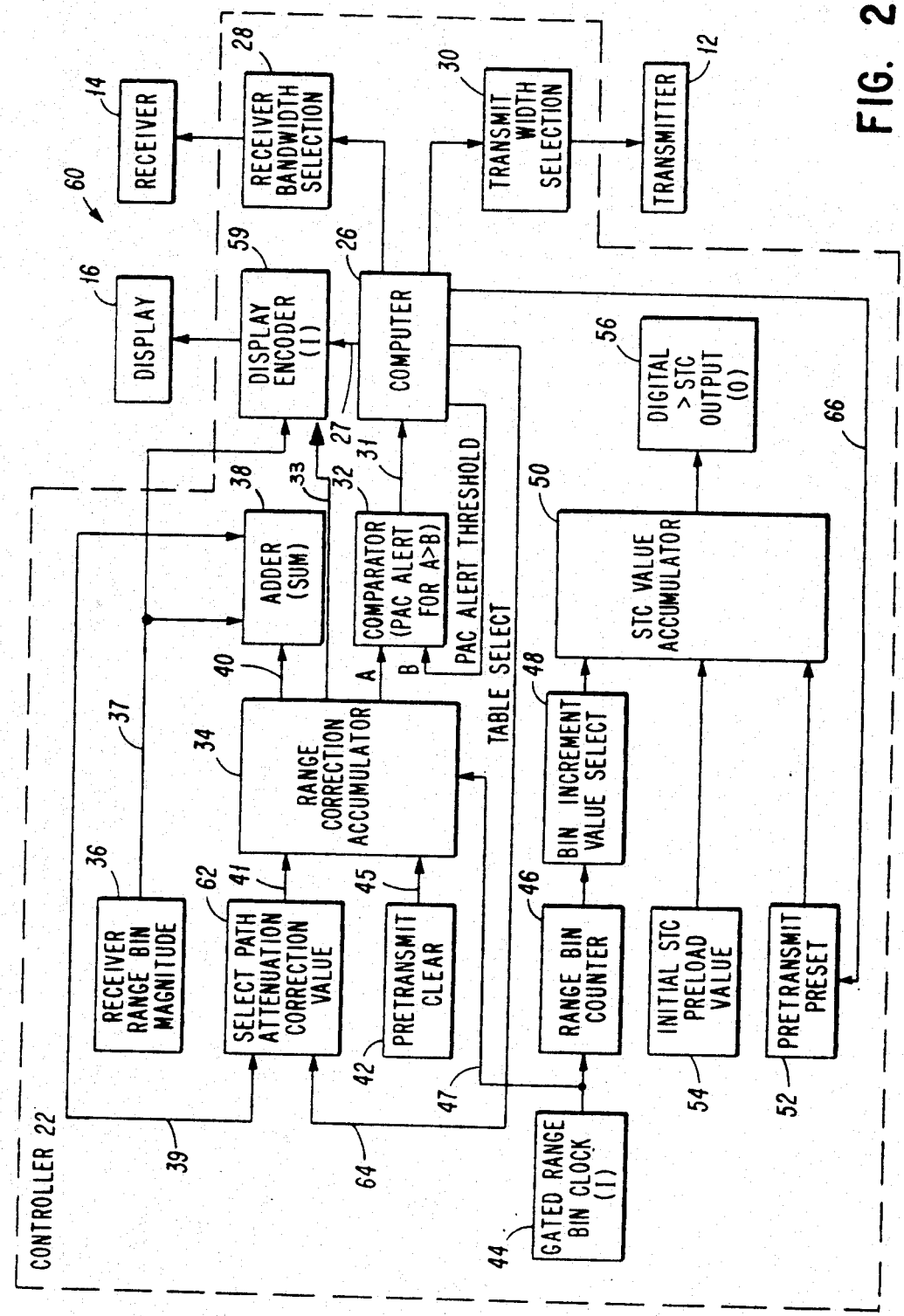
FIG. 2 is a functional block diagram corresponding to that of the prior art radar system shown in FIG. 1B but with the new elements added thereto needed to implement the preferred embodiment of the invention.

Referring now to FIG. 2, the preferred embodiment of the radar system 60 of the present invention is seen to have substantially the same functional blocks as the prior art of FIG. 1B and the same or similar elements have been assigned the same reference numbers. A new block, the comparator 32, has been added which receives input A from the range correction accumulator 34 and input B from the computer 26 and provides the result of the A to B comparison as a comparator binary output 31 which is routed to the computer 26. Input B is the PAC alert threshold, a variable selectable system parameter based upon system performance capability and defines the path attenuation level above which a detected path attenuation is considered excessive. In this configuration the computer 26 sends the PAC alert 27 to the display encoder 59 for application to the display 16. While FIG. 2 shows the comparison being performed by the hardware block 32, it should be appreciated by those skilled in the art that the computer could be programmed to make the comparison itself, in which case the output A would be connected directly to the computer 26.

On each received radial, when the desired maximum range for PAC has been completed, comparator 32 compares the signal on input A from the range correction accumulator 34 and the PAC alert threshold signal on input B from the computer 26. The PAC alert threshold B from computer 26 is a reference number based upon the present performance configuration and defines the path attenuation level above which a detected path attenuation level is considered excessive. The result of the comparison is stored in computer 26. If the comparison shows that the signal on input A exceeds that of the PAC alert threshold input B, the comparator binary output 31 received by computer 26 indicates a PAC alert. When a sufficient number of the most recent comparator outputs indicate a consistent PAC alert, the computer 26 sends a signal to the transmit pulse width selection 30 to increase the transmitted pulse width from transmitter 12, the computer 26 sends a signal to the receiver bandwidth selection 28 to decrease the receiver bandwidth of receiver 14, the computer 26 selects a new initial STC preload value 54 via 66 to maintain the calibration threshold of the receiver, and the computer 26 modifies table select 64 to select the applicable PAC correction table of select path attenuation correction value 62. In this manner the computer 26 gradually extends system range performance until the PAC alert 27 is cancelled or maximum system range performance capability has been achieved.

Conversely, if the comparator output 31 indicates an absence of a PAC alert and the present pulse width and bandwidth selections are not those required for minimum system performance for the selected range, the computer 26 sends a signal to the transmit pulse width selection 30, decreasing the transmitted pulse width from transmitter 12, the computer 26 sends a signal to the receiver bandwidth selection 28 to increase the receiver bandwidth of receiver 14, the computer 26 selects a new initial STC preload value 54 via 66 to maintain the calibration threshold of the receiver, and the computer 26 modifies table select 64 to select the applicable PAC correction table of select path attenuation correction value 62. In this manner computer 26 gradually reduces system range performance until a PAC alert 27 occurs or the minimum system performance parameters required to support the selected range have been selected.

In the hardware implementation only a go-no go indication is provided to the computer so any correction toward reduced system performance (increased range resolution) is delayed until the antenna has moved approximately ¾ of a beam width (one-way) at its normal scan rate from the position where the last PAC alert was observed. The computer software implementation provides the advantage of having the PAC value available for comparison to the tabled PAC alert threshold values resident in the computer. Magnitude comparisons between the two values can result in more rapid selection of system Parameters which satisfy the requirements. For this reason the software implementation may be preferred.

When changes in system performance are initiated by computer 26, it selects from a list of available transmit pulse width - receiver bandwidth combinations together with associated PAC threshold and initial STC values. Each combination provides a computed system performance capability which when considered with the PAC situation and the desired operating range is the basis for any decision to change operating parameters.

An increase in transmitted pulse width together with associated decrease in receiver bandwidth will increase system range performance while the converse, a decrease in transmitted pulse width and increase in receiver bandwidth will decrease system range performance. If after increasing the system performance the PAC still exceeds the PAC threshold, the comparator 32 indicates the condition and the computer 26 adjusts the radar system to a higher performance level to extend the range capability. If the PAC still exceeds the PAC threshold the performance level will continue to be increased until the PAC is less than the PAC threshold or the performance increase has reached the maximum capability of the system. If the PAC alert condition still exists at the end of the correction process, a PAC alert 27 is sent to the display encoder 59 for application to the display 16 on the applicable display radial 18. This notifies the operator of an excessive path attenuation condition for which the radar system is unable to compensate with performance increases.

When the weather radar system 60 receives echo returns 19 that do not have excessive path attenuation and the system performance selected is not at the minimum required to support the selected range, a reduction in system range performance is indicated. After maintaining the present performance for a preset amount of time, the computer 26 will gradually decrease performance (increase range resolution) as long as a PAC alert is not detected or until the minimum performance required for the selected range exists. If a PAC alert is detected the computer 26 begins the performance increase sequence.

The following changes to the system parameters function to increase the system performance and recalibrate the system for the same range-threshold sensitivity as that of the previous parameter selections. The steps are:

1. Select the next incrementally longer transmit pulse width;
2. Select the optimal receiver bandwidth for the selected transmit pulse width via the transmit pulse width selection circuit 30;
3. Adjust the initial sensitivity time control (STC) value for correct range compensation via an input 66 to the initial STC preload value 54;
4. Select the PAC correction value for the new bandwidth and pulse width selected via a table select signal applied to input 64 of the select path attenuation correction value circuit 62; and
5. Select a new PAC alert threshold via a PAC alert threshold signal applied to input B of PAC alert comparator 32.

If the selected parameters are sufficient to suppress the PAC alert, the selection is maintained for use for about ¾ antenna beam width of interrogations before gradually reverting back toward the original parameter selection. If the new selection is not sufficient to eliminate the PAC alert, the next parameter selection progressing toward the longest pulse width is made. If the longest available pulse width has been selected and fails to provide full range performance, the system maintains the selection and displays the PAC alert, as noted above. Also, all other parameters are selected by software in response to the PAC alert according to a lookup table as described above.

Referring now to FIG. 3, another embodiment of the radar system of the present invention in which comparisons are made by a comparison program of computer 26 instead of comparator 32. This embodiment more closely corresponds to the WRT-701X Radar System with Path Attenuation owned by Rockwell International Corporation and noted above and reference may be made to the aforementioned manuals relating thereto which are noted above for details. Briefly, the clock source or a range bin clock 44 provides range related timing referenced to the leading edge of the transmit pulse. The pretransmit clear block 42 generates a radial reset, digital signal to clear an accumulator latch just prior to the transmit pulse. Signals for correction on line 37 are the range related radar return digital magnitude signals from the receiver range bin magnitude block 34, shown in FIG. 2, to be compensated for path attenuation losses. The range bin clock 44 divides the receive range into time intervals used by the digital processing. A correction table selection block 70 provides for selection of tables of compensation values for different transmitted pulse widths. The tables are arranged according to pulse width, magnitude and range bin clock interval. The computer IO bus 26A is the common bus of the computer 26 which contains the parameter selection capability for the radar transmitter 12 and receiver 14. The computer data transfer strobe 26B enables the bus 26A so the total path attenuation value for the last received radial may be transferred to the computer memory. On the latch on radial reset 26C, a latch signal is provided which occurs subsequent to accumulation of the total path compensation accumulated for the radial and prior to the radial reset.

For each radial 18 a correction is determined on a range bin accumulation basis. A scale conversion block 74 converts the input signal from receiver range bin block 36 to a common resolution for the PAC circuits. It also checks the magnitude to determine if the signal level is sufficient for correction and enables the PAC clock logic block 76 through means of an output 79 from a data latch block 78 if a correction is to be made. Data latch 78 stores the scaled input and the clock enable decision for subsequent processing. Adder 38 combines the scaled signal level from data latch block 78 with the accumulated path corrections of the accumulator latch 85 from the previous range bins, the intervening range, for application to the current range bin correction block 82 which outputs the correction for the PAC corrected current input signal magnitude. The sum previous+current block 86 combines the path correction for the current range bin with those accumulated for all previous range bins. This value is then stored in the latch accumulator 85 for use in calculations for the next range bin.

At some predetermined range maximum for which PAC is desired, the accumulated PAC output for the radial (sum previous+current) is latched into the transfer register 88 which provides the computer 26 access to the accumulated PAC value. Using this value and the system parameters, the decision can be made to change receiver and transmitter parameters to increase or decrease system performance as necessary.

An example for a receiver/transmitter with the following parameter selections will illustrate the adjustment required.

| Case No. No. | Pulse Width Microseconds | Bandwidth KHz | Maximum Range* Nautical Miles | Performance Improvement |
|---|---|---|---|---|
| I | 1 | 1000 | 2 | Reference |
| II | 2 | 500 | 4 | +6 DB |
| III | 4 | 250 | 8 | +12 |
| IV | 6 | 167 | 12 | +15.6 |
| V | 8 | 125 | 16 | +18.1 |
| VI | 10 | 100 | 20 | +20.0 |

Assuming a beam filling weather target, the adjustment sequence would occur as follows. For a selected PAC range maximum of 5 nm, the initial case selection would be case III as this is the minimum capability that equals or exceeds 5 nm. The available PAC that can be applied for this situation is: PAC MAX III = 20 Log10 (8 NM/5 NM) = 4.08 DB.

As long as the "sum previous+current" value < =4.08 no change in selection is made. Assuming the intervening weather targets result in a "sum previous+current" value=6 DB, then the parameters would be adjusted such that:

20 Log10 (Maximum Range/5) >= 6 DB

Using the selections available, PAC MAX IV=20 Log10 (12/5)=7.6 DB which is>6 DB so case IV would be selected.

If on any radial the "sum previous+current" value<=4.08 DB, the computer would revert to case III for the next radial. In actual practice it may be desirable to introduce a small amount of hysteresis between case selections to avoid an excessive amount of parameter switching when the range capability is to be reduced. For instance, reversion from case IV to case III might only be allowed if the "sum previous+current" value>=3.08 DB while reversion from case III to case IV would still occur for values>=4.08 DB.

While a particular embodiment has been disclosed in detail, it should be appreciated that many changes may be made without departing from the scope of the invention as defined in the appended claims. For instance, while it is preferred to increase range from a relatively low initial range until there is no PAC alert, the system could also be operated by decreasing the range from a relatively high value until there is a PAC alert.

I claim:

1. In a weather radar system having a pulse transmitter, a receiver, means for compensating for path attenuation and means for detecting when the path attenuation is excessive and beyond the capability of the compensating means to correct display errors caused by the excessive path attenuation, the improvement being an automatic range adjuster, comprising:
   means for selectively altering the width of the pulses generated by the pulse transmitter; and
   means for automatically controlling the selective width altering means to alter the pulse width of the transmitter pulses in response to the excessive path attenuation means.

2. The weather radar system of claim 1 in which said automatically pulse width controlling means includes means for automatically controlling the selective width altering means to increase the pulse width of the transmitter pulses in response to detection of excessive path attenuation.

3. The weather radar system of claim 1 including means for altering the level at which excessive path attenuation is detected in accordance with changes of the transmitter pulse width.

4. The weather radar system of claim 3 in which said path attenuation level altering means includes means for increasing the level at which excessive path attenuation is detected in accordance with increases of the transmitter pulse width.

5. The weather radar system of claim 4 including means for providing an indication of excessive path attenuation in response to detection of excessive path attenuation when the system is operating with a maximum transmitter pulse width.

6. The weather radar system of claim 3 in which said automatically controlling means includes means for successively increasing the transmitter pulse width respectively in response to successive detections of excessive path attenuation at successively increasing levels of excessive path attenuation detection until a maximum transmitter pulse width is obtained.

7. The weather radar system of claim 3 in which said automatic controlling means includes means responsive to nondetection of excessive path attenuation at an increased level for a given transmitter pulse width to cause said pulse width altering means to maintain the given transmitter pulse width for a preselected time.

8. The weather radar system of claim 7 in which at the end of said preselected timer period said automatic controlling means includes means for causing the selectively altering means to lower the transmitter pulse width to the width at which the transmitter pulses were previously being generated before being increased by the automatic controlling means.

9. The weather radar system of claim 1 including means for varying in accordance with variations of the pulse width at least one of the four system parameters of (a) receiver bandwidth, (b) initial sensitivity time control value for range compensation, (c) path attenuation compensation, and (d) path attenuation level at which excessive path attenuation is detected.

10. The weather radar system of claim 9 in which at least two of the four system parameters are changed by said varying means.

11. The weather radar system of claim 9 in which at least three of the four system parameters are changed by said varying means.

12. The weather radar system of claim 9 in which all of the four parameters are changed by said varying means.

13. In a weather radar system including a pulse transmitter, a receiver with a variable band width and means for determining path attentuation, the improvement being an automatic range extender, comprising:
   means for detecting excessive path attentuation:
   means responsive to said detecting means for extending the range of the system including means for automatically altering the receiver bandwidth;
   said receiver bandwidth altering means alters the bandwidth in accordance with the width of pulses transmitted by the pulse transmitter in response to excessive path attentuation detection:
   said range extending means includes means responsive to said detecting means for varying the width of the pulses generated by said pulse transmitter; and
   said range extending means includes means responsive to said detecting means for varying at least one of the system parameters of (a) transmitter pulse width (b) initial sensitivity time control value for correct range compensation (c) oath attenuation compensation and (d) path attentuation level for detection of excessive path attentuation.

14. The weather radar system of claim 13 in which a different set of parameters are associated with each different receiver bandwidth.

15. A method of operating a weather radar system comprising the steps of:
   initially operating the system with a given set of parameters for a selected resolution for a given range; and
   detecting excessive path attenuation; and
   automatically changing the system to operate with successive sets of parameters to successively alter the range in increments in response to detection of excessive path attenuation.

16. The method of claim 15 in which said step of initially operating includes the step of operating the system with a given set of parameters for a selected resolution for a given range, and said step of automatically changing the system to operate with successive sets of parameters includes the step of changing the parameters to successively extend the range in increments in response to detection of excessive path attenuation until the first to occur of (a) detection of nonexcessive path attenuation and (b) achievement of maximum range.

17. The method of claim 16 including the step of returning to a set of parameters associated with a relatively lower range a preselected time after the parameters are changed to achieve a relatively greater range in response to detection of excessive path attenuation.

18. The method of claim 15 in which said step of automatically changing the system includes the substeps of changing at least one parameter for each set of parameters of (a) receiver bandwidth (b) initial sensitivity time control value for range compensation (c) path attenuation compensation (d) level of path attenuation at which excessive path attenuation is detected and (e) transmitter pulse width.

19. The method of claim 18 in which all said parameters are varied.

20. The method of claim 18 in which the parameters (a), (b), (c) and (d) are varied to achieve optimum performance for increases in the transmitter pulse width for increased range.

* * * * *